United States Patent
Miyazawa et al.

(10) Patent No.: US 10,623,652 B2
(45) Date of Patent: Apr. 14, 2020

(54) IMAGE CAPTURING APPARATUS AND METHOD FOR IMAGE STABILIZATION AND CONTROL USING MOTION VECTORS

(71) Applicant: CANON KABUSHIKI KAISHA, Tokyo (JP)

(72) Inventors: Hitoshi Miyazawa, Kawasaki (JP); Hiroyo Kobuna, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 37 days.

(21) Appl. No.: 15/976,211

(22) Filed: May 10, 2018

(65) Prior Publication Data

US 2018/0262668 A1 Sep. 13, 2018

Related U.S. Application Data

(62) Division of application No. 15/414,732, filed on Jan. 25, 2017, now Pat. No. 10,205,885.

(30) Foreign Application Priority Data

Jan. 26, 2016 (JP) .................................. 2016-012791
Jan. 27, 2016 (JP) .................................. 2016-012906

(51) Int. Cl.
*H04N 5/228* (2006.01)
*H04N 5/235* (2006.01)
(Continued)

(52) U.S. Cl.
CPC ............. *H04N 5/2352* (2013.01); *G02B 7/09* (2013.01); *G02B 27/646* (2013.01);
(Continued)

(58) Field of Classification Search
CPC .......................... H04N 5/2352; H04N 5/23261
(Continued)

(56) References Cited

U.S. PATENT DOCUMENTS

2007/0019937 A1* 1/2007 Endo ..................... G03B 7/093
396/52

FOREIGN PATENT DOCUMENTS

JP 2006-317848 A 11/2006
JP 2015-102774 A 6/2015
(Continued)

OTHER PUBLICATIONS

Nov. 26, 2019 Japanese Office Action, which is enclosed without an English Translation, that issued in Japanese Patent Application No. 2016012906.

*Primary Examiner* — Usman A Khan
(74) *Attorney, Agent, or Firm* — Cowan, Liebowitz & Latman, P.C.

(57) ABSTRACT

An image capturing apparatus comprising: an image sensor that shoots a subject image that is incident thereon via an imaging optical system; a setting unit that sets a background flow amount in panning shooting; a calculation unit that calculates, in panning shooting, an exposure period of exposing the image sensor from the background flow amount, an angular velocity detected by a detection unit that detects an angular velocity of vibration, and a focal length of the imaging optical system, so as to obtain the background flow amount set by the setting unit; and a limitation unit that, if the exposure period calculated by the calculation unit is greater than or equal to a predetermined threshold value, limits the exposure period to the threshold value.

4 Claims, 13 Drawing Sheets

(51) Int. Cl.
  *H04N 5/232* (2006.01)
  *G02B 27/64* (2006.01)
  *G02B 7/09* (2006.01)

(52) U.S. Cl.
  CPC ....... *H04N 5/2353* (2013.01); *H04N 5/23258* (2013.01); *H04N 5/23261* (2013.01); *H04N 5/23287* (2013.01); *H04N 5/23293* (2013.01)

(58) Field of Classification Search
  USPC ..................................................... 348/208.2
  See application file for complete search history.

(56) References Cited

FOREIGN PATENT DOCUMENTS

| | | | |
|---|---|---|---|
| JP | 2015-161730 A | 9/2015 | |
| JP | 2015185925 A | 10/2015 | |
| JP | 2015198439 A | 11/2015 | |
| JP | 2015-219462 A | 12/2015 | |

* cited by examiner

F I G. 11A
F I G. 11B
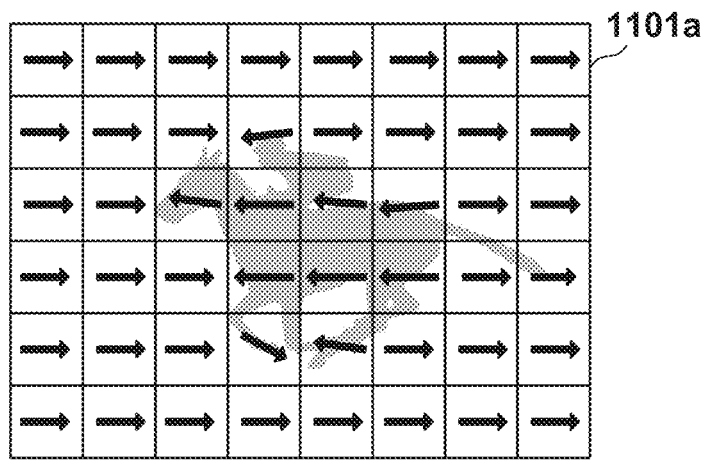
F I G. 11C
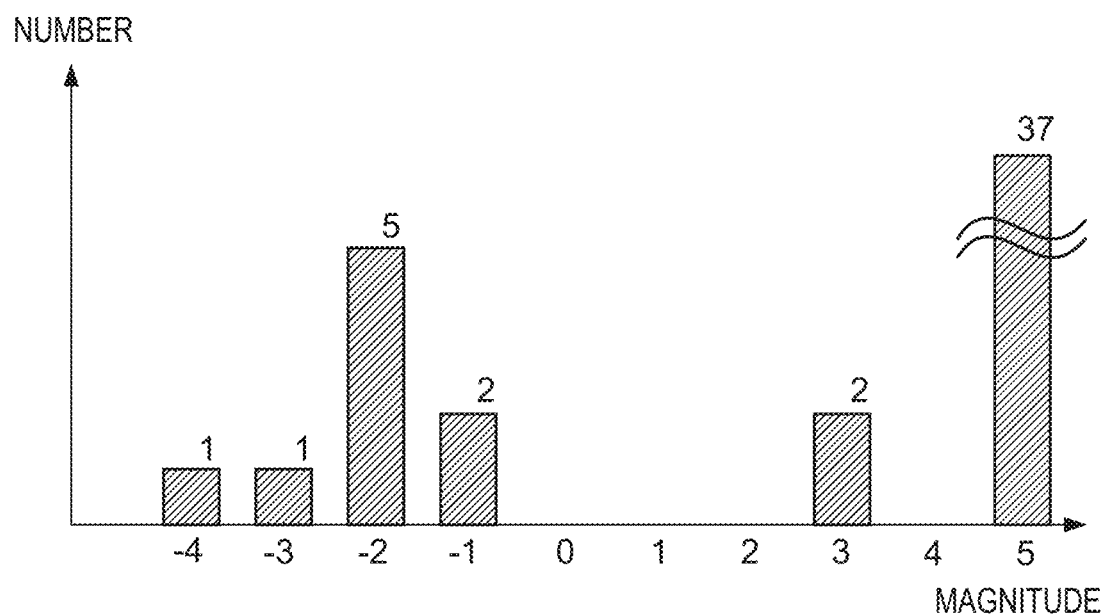

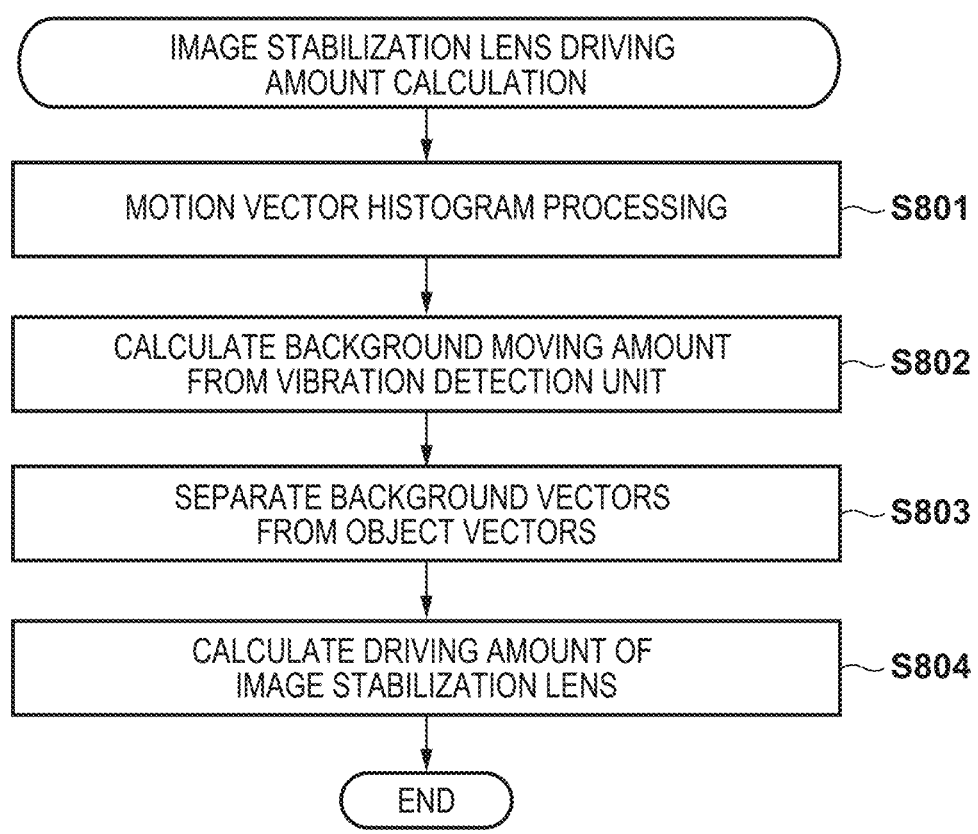

IMAGE CAPTURING APPARATUS AND METHOD FOR IMAGE STABILIZATION AND CONTROL USING MOTION VECTORS

CROSS-REFERENCE TO RELATED APPLICATIONS

This application is a divisional of application Ser. No. 15/414,732, filed Jan. 25, 2017 the entire disclosure of which is hereby incorporated by reference.

BACKGROUND OF THE INVENTION

Field of the Invention

The present invention relates to an image capturing apparatus and a method for controlling the image capturing apparatus, an image stabilization apparatus and a method for controlling the image stabilization apparatus, and lens unit.

Description of the Related Art

Conventionally, image capturing apparatuses capable of panning shooting are known. Panning shooting refers to a technique of shooting, in a case where a subject is moving at a certain speed, an image in which the background flows while the subject appears to not be moving, by exposing the image while panning an image capturing apparatus so as to follow the movement of the subject. In panning shooting, usually, shooting is performed at a slow shutter speed so as to express a sense of dynamicity in the subject.

However, skill is required to follow a subject (e.g. a train that is moving at 60 km/h) well while panning the camera at a slow shutter speed (e.g. 1/30 seconds) to shoot the subject. In particular, for beginners, it is difficult to adjust the camera panning speed to the subject speed during an exposure period at a slow shutter speed, which is why panning shooting is a difficult shooting technique. To enable such panning shooting to be readily performed, a method using an image stabilization apparatus is known.

In general, a good example of a pan shot is an image in which a subject stands still while the background flows in a direction opposite to the moving direction of the subject. To shoot such an image in which a subject stands still, Japanese Patent Laid-Open No. 2006-317848 discloses a method in which the difference between the subject speed and the camera panning speed is detected, and correction is performed according to the shift amount corresponding to this difference, using an image stabilization function. With this method, immediately before shooting, the angular velocity of the camera that is following the subject during the panning (or tilting) is detected by an angular velocity sensor in the camera. Simultaneously, the moving amount of a main subject image on an imaging plane is detected. The angular velocity of the subject is calculated from the detected panning speed and moving amount of the subject image on the imaging plane. During exposure, an image stabilization operation is performed in accordance with the amount of difference between the calculated angular velocity of the main subject and the output from the angular velocity sensor in the camera. Thus, the vibration amount and the difference between, the speed of the main subject and the camera panning speed are corrected, which enables suppression of image blur of the main subject subjected to panning shooting.

Japanese Patent Laid-Open No. 2015-161730 discloses an image stabilization apparatus that causes timing of the output of the moving amount of a subject image on an imaging plane and the output from a vibration detection unit to coincide with each other, and improves the accuracy of detection of the angular velocity of the subject. Japanese Patent Laid-Open No. 2015-102774 discloses a photographic apparatus that determines a shutter speed to be used when capturing an image of subject light with an image sensor based on an angular velocity and a focal length.

It is, however, difficult for a beginner to set a correct shutter speed for shooting an image in which the background flows icy an appropriate amount in a direction opposite to the moving direction of the subject. This can be comprehended from experience because the shutter speed is determined based on the subject speed, the focal length of the imaging lens, the shooting distance from the subject, and the panning (or tilting) speed of the photographer.

If the shutter speed is too fast, the subject is less likely to blur but the background does not flow, resulting in the subject appearing less dynamic, and an obtained image may not be satisfactory when considered as an exemplary work of panning shooting. On the other hand, if the shutter speed is too slow, the background flows but the exposure period becomes long, thus the subject is likely to blur due to a camera shake, which results in an increase in the likelihood of failing the panning shooting.

In addition, Japanese Patent Laid-Open No. 2015-161730 does not disclose an assist function for setting an exposure period when panning shooting is performed. For this reason, it is difficult for a photographer who is not used to panning shooting to calculate an appropriate exposure period to obtain an intended flow amount. In the image capturing apparatus disclosed in Japanese Patent Laid-Open No. 2015-102774, consideration is not given to variation in speed in the same subject. For example, when shooting a running animal, a part of the subject may flow in the obtained image depending on the settings. This phenomenon occurs when a fast-moving portion exists in the subject and a long exposure period is set relative to the moving speed of this portion, and the image shot at this time may lose its ambience brought out by panning shooting.

SUMMARY OF THE INVENTION

The present invention has been made in consideration of the above situation, and enables even a photographer who is not used to panning shooting to readily set a shutter speed at which a panning shooting effect can be obtained.

According to the present invention, provided is an image capturing apparatus comprising: an image sensor that shoots a subject image that is incident thereon via an imaging optical system; a setting unit that sets a background flow amount in panning shooting; a calculation unit that calculates, in panning shooting, an exposure period of exposing the image sensor from the background flow amount, an angular velocity detected by a detection unit that detects an angular velocity of vibration, and a focal length of the imaging optical system, so as to obtain the background flow amount set by the setting unit; and a limitation unit that, if the exposure period calculated by the calculation unit is greater than or equal to a predetermined threshold value, limits the exposure period to the threshold value.

Further, according to the present invention, provided is a method for controlling an image capturing apparatus during panning shooting using an image sensor for shooting a subject image that is incident thereon via an imaging optical system, the method comprising: setting a background flow amount; calculating an exposure period of exposing the image sensor from the background flow amount, an angular velocity detected by a detection unit that detects an angular velocity of vibration, and a focal length of the imaging optical system, so as to obtain the set background flow amount; and if the calculated exposure period is greater than or equal to a predetermined threshold value, limiting the exposure period to the threshold value.

Furthermore, according to the present invention, provided is an image stabilization apparatus comprising: a calculation unit that calculates a motion vector of a subject included in an image; an acquisition unit that acquires a focal length; and a control unit that controls an exposure period based on the motion vector of the subject, vibration information detected by a detection unit, and the focal length.

Further, according to the present invention, provided is an image capturing apparatus comprising: an image sensor that performs photoelectric conversion on an optical image formed via an imaging optical system, and output image data; a calculation unit that calculates a motion vector of a subject included in an image corresponding to the image data; an acquisition unit that acquires a focal length; and a control unit that controls an exposure period based on the motion vector of the subject, vibration information detected by a detection unit, and the focal length.

Further, according to the present invention, provided is a lens unit comprising: an imaging optical system; a calculation unit that calculates a motion vector of a subject included in an image acquired via the imaging optical system a detection unit configured to detect vibration information; an acquisition unit configured to acquire a focal length; and a control unit configured to control an exposure period based on the motion vector of the subject, the vibration information, and the focal length.

Further, according to the present invention, provided is a method for controlling an image stabilization apparatus comprising: calculating a motion vector of a subject included in an image; detecting vibration information; acquiring a focal length; and controlling an exposure period based on the motion vector of the subject, the vibration information, and the focal length.

Further, according to the present invention, provided is a storage medium storing a program for causing a computer to execute processing for: calculating a motion vector of a subject included in an image; detecting vibration information; acquiring a focal length; and controlling an exposure period based on the motion vector of the subject, the vibration information, and the focal length.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIGS. 11A to 11C are illustrative diagrams of motion vectors according to the second embodiment;

FIG. 12 is a flowchart showing a method for calculating a driving amount of an image stabilization lens according to the second embodiment.

DESCRIPTION OF THE EMBODIMENTS

Exemplary embodiments of the present invention will be described in detail in accordance with the accompanying drawings.

Figure 1:
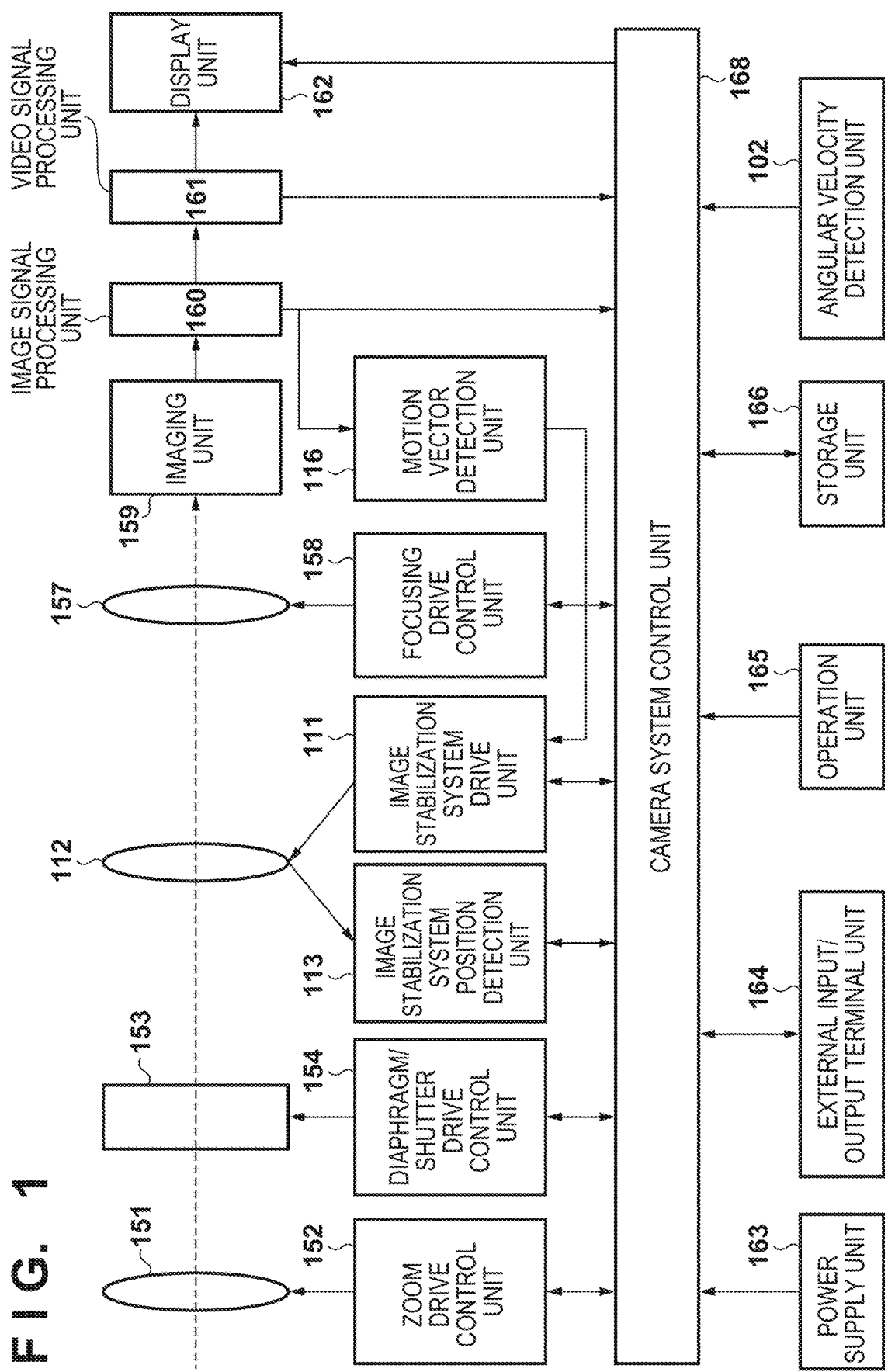
FIG. 1 is a block diagram showing a functional configuration of an image capturing apparatus according to a first embodiment of the present invention.

FIG. 1 is a block diagram showing a functional configuration of an image capturing apparatus that includes an image stabilization system according to an embodiment of the present invention. Although this embodiment will describe, as an image capturing apparatus, a digital camera capable of shooting a still image, the present invention is not limited to a digital camera and is also applicable to photographic apparatuses such as a monitoring camera, a web camera, and a cellular phone.

In FIG. 1, an imaging optical system is configured to include a zoom unit 151 that includes a zoom lens for changing a magnification ratio, a diaphragm/shutter unit 153, an image stabilization unit 112, and a focusing unit 157 that includes a lens for adjusting focus. The zoom unit 151 is controlled and driven by a zoom drive control unit 152, the diaphragm/shutter unit 153 is controlled and driven by a diaphragm/shutter drive control unit 154, and the focusing unit 157 is controlled and driven by a focusing drive control unit 158.

An image stabilization system drive unit 111 is a voice coil motor for driving the image stabilization unit 112 which is driven by the image stabilization system drive unit 111 to move in a direction perpendicular to the optical axis. An image stabilization system position detection unit 113 is constituted by a magnet and a Hall sensor provided at a position opposing the magnet, detects a moving amount of the image stabilization unit 112 in a direction perpendicular to the optical axis, and supplies the detection result to a subtracter 108 via an A/D converter 114. The image stabilization unit 112 is a shift lens, for example, and is a correction system that shifts the optical axis by being moved in a direction perpendicular to the optical axis and enables optical image stabilization. Otherwise, an imaging unit 159 may be moved in a direction perpendicular to the optical axis. As a result, an image in which movement of a subject on an imaging plane due to a shake of the apparatus or the like has been corrected is formed on the imaging unit 159.

The imaging unit 159 performs photoelectric conversion on a subject image that is incident via the aforementioned imaging optical system into an electric signal. The electric signal output from the imaging unit 159 is subjected to conversion processing and converted into a video signal by an image signal processing unit 160, and, according to the purpose, is further processed by a video signal processing unit 161. A display unit 162 displays an image, as necessary, based on the signal output from the video signal processing unit 161.

A power supply unit 163 supplies power to the overall image capturing apparatus according to the purpose. An external input/output terminal unit 164 inputs and outputs a communication signal and a video signal to/from an external apparatus (not shown).

An operation unit 165 is used to operate the system, and includes an image stabilization ON/OFF switch, a shutter release button, a moving image recording switch, a reproduction mode selection switch, a magnification changing switch, and a panning shooting mode setting switch.

The image stabilization ON/OFF switch enables shake correction to be selectively turned on and off, and, upon image stabilization being turned on by the image stabilization ON/OFF switch, a camera system control unit 168 instructs the image stabilization system drive unit 111 to perform an image stabilization operation. Upon receiving this instruction, the image stabilization system drive unit 111 performs the image stabilization operation until an instruction to turn off image stabilization is given.

The shutter release button is configured to enable two-step operation, i.e. such that a first switch (SW1) and a second switch (SW2) turn on in this order in accordance with a pressing amount. The shutter release button has a structure in which the first switch SW1 turns on when the shutter release button is roughly half-pressed (first step), and the second switch SW2 turns on when the shutter release button is fully pressed (second step). Upon the first switch SW1 turning on, the focus drive control unit 158 drives the focusing unit 157 to adjust the focus, and the diaphragm/shutter drive control unit 154 drives the diaphragm/shutter unit 153 to set an appropriate exposure. Upon the second switch SW2 turning on, image data obtained from an optical image exposed on the imaging unit 159 is stored in a storage unit 166.

Moving image shooting is started upon a moving image recording switch being pressed, and the recording ends upon the switch being pressed again during the recording. Still image shooting during recording of a moving image is also possible by pressing the first switch SW1 and the second switch SW2 during the shooting of the moving image.

Upon the reproduction mode selection switch being pressed, a reproduction mode is selected. Note that the image stabilization operation stops when in the reproduction mode.

The magnification changing switch is a switch for giving an instruction to change the zoom magnification ratio. Upon an instruction to change the zoom magnification ratio being given by the magnification changing switch, the zoom drive control unit 152 that has received the instruction via the camera system control unit 168 drives the zoom unit 151 and moves the zoom unit 151 to a zoom position designated in the instruction. Also, the focus drive control unit 158 drives the focusing unit 157 to adjust the focus based on image information that has been sent from the imaging unit 159 and processed by the image signal processing unit 160 and the video signal processing unit 161.

The panning shooting mode setting switch enables a panning shooting mode to be selectively turned on and off, and, upon panning shooting being selected, an image stabilization operation suitable for panning shooting and a shutter speed suitable for panning shooting are set.

The storage unit 166 stores various data such as picture information. An angular velocity detection unit 102 is an angular velocity sensor that uses a sensor such as a gyro sensor to detect, as an angular velocity, the amount of vibration applied to the camera, and outputs a vibration signal (angular velocity data) obtained by converting the detected angular velocity into a voltage. The camera system control unit 168 controls the overall image capturing apparatus. A motion vector detection unit 116 detects motion vectors in an image based on a luminance signal included in a current video signal generated by the image signal processing unit 160, and a luminance signal included in a video signal of the immediately previous frame.

Figure 2:
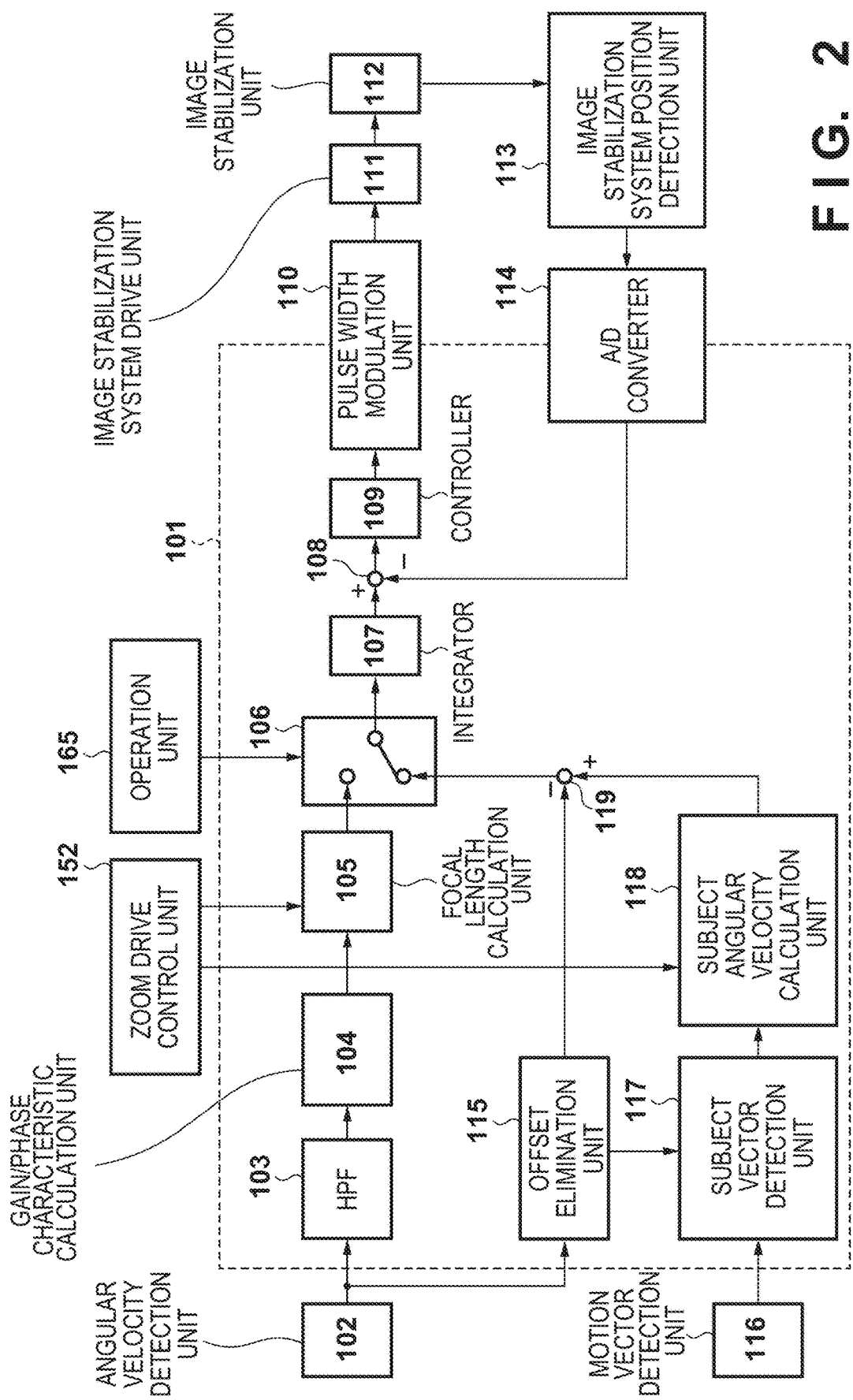
FIG. 2 is a block diagram showing a functional configuration of an image stabilization system according to the first embodiment.

FIG. 2 is a block diagram showing a functional configuration of the image stabilization system mounted in the digital camera shown in FIG. 1. Note that the following description will be given of image stabilization control in either one of the yaw direction and the pitch direction of an image, and a description of image stabilization control in the other direction, which is performed similarly, will be omitted.

The angular velocity data output from the angular velocity detection unit 102 is supplied to a high pass filter (HPF) 103 within a μCOM 101 configured in the camera system control unit 168. The HPF 103 has a function capable of changing the characteristics in any frequency band, cuts off low frequency components included in the angular velocity data, and thereafter outputs a signal in a high frequency band. Note that, instead of providing the HPF 103, a configuration may be employed in which a signal obtained by passing the output from the angular velocity detection unit 102 through a low pass filter (LPF) for cutting off a signal in a high frequency band is subtracted from the output from the angular velocity detection unit 102.

A gain/phase characteristic calculation unit 104 is constituted by an amplifier for amplifying the output from the HPC 103, with a given gain, and a phase compensation filter.

A focal length calculation unit 105 calculates a focal length of the imaging optical system from zoom information that indicates a state of the zoom lens output from the zoom drive control unit 152, and corrects the output from the gain/phase characteristic calculation unit 104 so as to obtain an optimum value for driving the image stabilization unit 112.

Meanwhile, the motion vectors output from the motion vector detection unit 116 are supplied to a subject vector detection unit 117. Also, an on-imaging plane moving amount on the imaging plane that is obtained by converting an angular velocity obtained as a result of an offset elimination unit 115 eliminating an offset component from the output from the angular velocity detection unit 102 is input to the subject vector detection unit 117. The motion vectors in the image are then separated into subject vectors and background vectors by using the input on-imaging plane moving amount. Note that the offset elimination unit 115 may use, as the offset component, the average value of the output of the angular velocity detection unit 102 in a case where the camera is in a stationary state, or may use a value obtained by converting a background vector in the immediately previous frame detected by the subject vector detection unit 117 into an angular velocity. As a method for separating the motion vectors into subject vectors and background vectors, for example, known methods such as the method described in Japanese Patent Laid-Open No 2015-161730 are available.

A subject angular velocity calculation unit 118 converts each of the subject vectors, which is the output from the subject vector detection unit 117, into a subject angular velocity by using information regarding a frame rate and the focal length included in the zoom information. A subtracter 119 subtracts the angular velocity of the image stabilization apparatus, which is the output from the offset elimination unit 115, from the subject angular velocity calculated by the subject angular velocity calculation unit 118, i.e. calculates a differential angular velocity between the subject and the camera.

A switch 106 for selecting a target signal for the image stabilization unit 112 switches between the output from the focal length calculation unit 105 and the output from the subtracter 119, based on information regarding ON/OFF of the panning shooting mode selected by using the panning shooting mode setting switch in the operation unit 165. If the panning shooting mode is ON, the switch 106 performs later-described subject blur correction, in which an output signal of the subtracter 119 is supplied to an integrator 107 to correct a blur of the subject. On the other hand, if the panning shooting mode is OFF, the switch 106 performs image stabilization, in which the output from the focal length calculation unit 105 is supplied to the integrator 107 to correct a blur for the entire image.

Note that a configuration may be employed in which it is determined whether the panning shooting mode is ON or OFF by comparing the output regarding the yaw direction and the output regarding the pitch direction from the angular velocity detection unit 102, rather than through the setting of the panning shooting mode setting switch. In this case, for example, if the output regarding one axis from the angular velocity detection unit 102 is larger than the output regarding the other axis from the angular velocity detection unit 102 (e.g. by 10 dps or more), it is determined that the camera is in a panning (or tilting) state and the panning shooting mode is ON. Note that, even in the panning shooting mode, if later-described subject vectors cannot be detected, the switch 106 is controlled so as to select the output from the focal length calculation unit 105.

The integrator 107 has a function capable of changing the characteristics in any frequency band, integrates the output from the switch 106, and calculates a driving amount of the image stabilization unit 112.

The subtracter 108 subtracts, from the output from the integrator 107, digital data that is obtained as a result of the A/D converter 114 performing A/D conversion on a signal indicating the position of the image stabilization unit 112 output from the image stabilization system position detection unit 113, and supplies the result to a controller 109.

The controller 109 is constituted by an amplifier that amplifies input data with a given gain, and a phase compensation filter. Deviation data that is supplied from the subtracter 108 is subjected to signal processing by the amplifier and the phase compensation filter in the controller 109, and is thereafter output to a pulse width modulation unit 110.

The pulse width modulation unit 110 modulates the supplied data that has passed through the controller 109 into a waveform for changing the duty ratio of a pulse wave (i.e. a PWM waveform), and supplies the waveform to an image stabilization system drive unit 111.

Next, a description will be given of a method for setting a shutter speed (exposure period) during panning shooting. The shutter speed during panning shooting is obtained by Equation (1) below.

$$Tv = \alpha/(f \times \omega) \quad (1)$$

Here, Tv denotes a shutter speed, f denotes a focal length, $\omega$ denotes an angular velocity, and $\alpha$ denotes a background flow amount.

The denominator on the right-hand side in Equation (1) is a product of the focal length f of the imaging lens and the angular velocity $\omega$ of the camera, and this value indicates a background flow speed on the imaging plane. The shutter speed Tv during panning shooting is calculated such that the background flow amount is always fixed independent of the angular velocity $\omega$ of the camera. In this embodiment, the background flow amount $\alpha$ can be changed through the operation unit 165 on a screen of the display unit 162 such that a photographer can set the background flow amount. This is because, for example, some photographers may consider 100 pixels to be an optimum background flow amount whereas other photographers may consider 300 pixels to be optimum, and even if photographers have a different preference of the background flow amount, a background flow amount corresponding to the preference can be set.

Figure 3A:
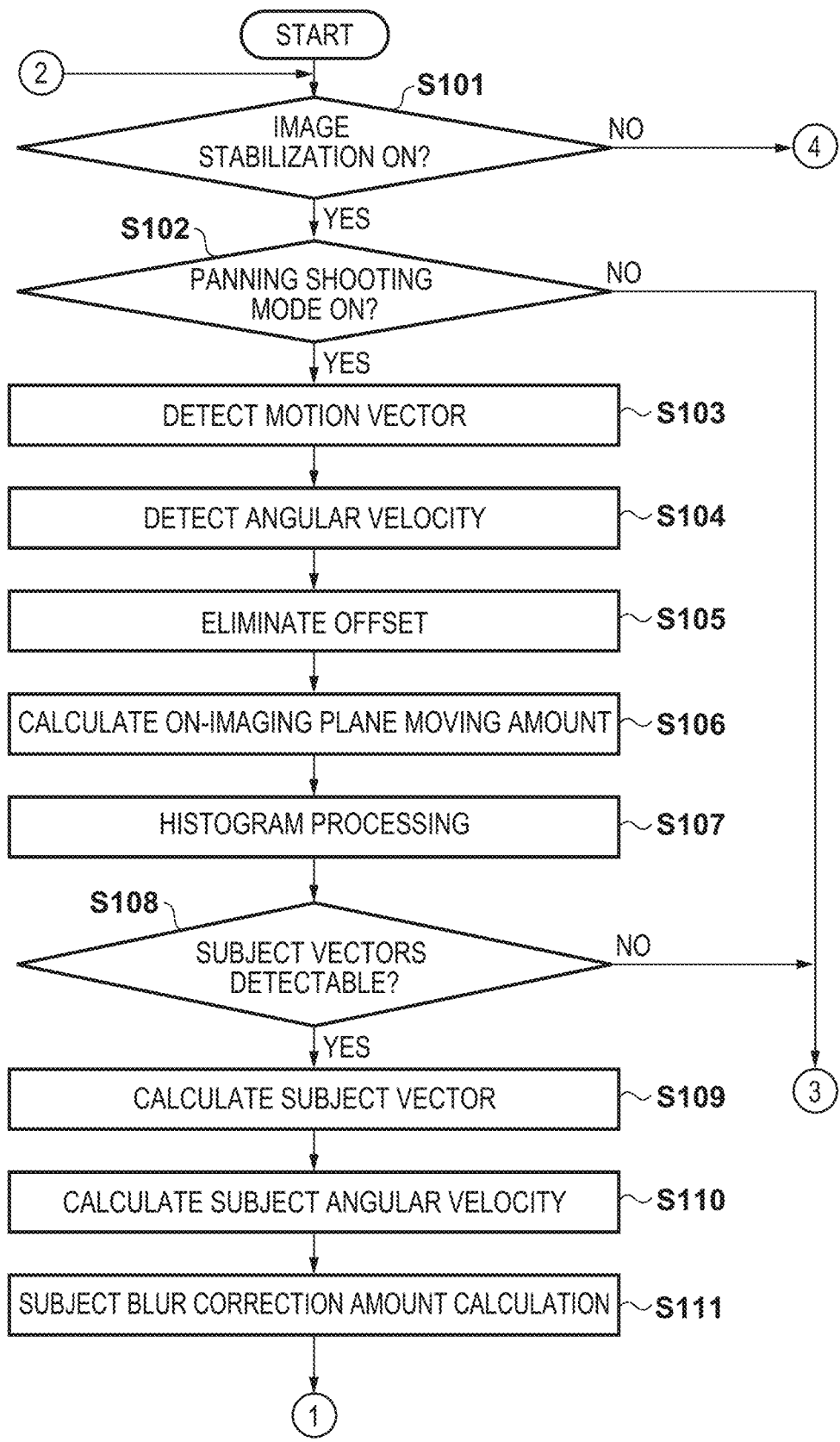
FIGS. 3A and 3B show a control flowchart at the time of shooting according to the first embodiment.
Figure 3B:
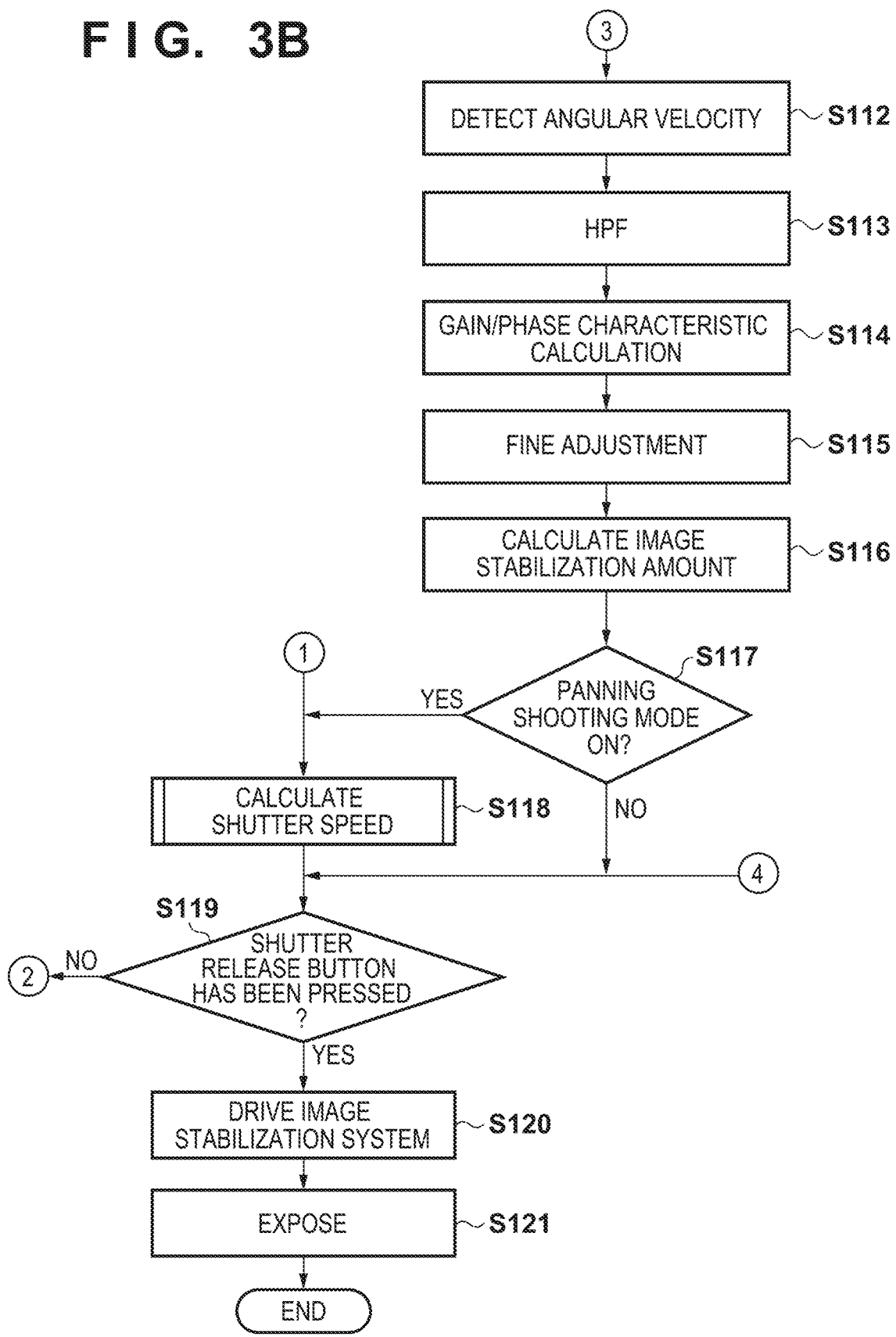

Next, a control flow during panning shooting according to the first embodiment will be described using FIGS. 3A and 3B.

Initially, in step S101, whether or not image stabilization is ON is determined, and the processing proceeds to step S102 if image stabilization is ON, and proceeds to step S119 if image stabilization is not ON. In step S102, as mentioned above, whether or not the panning shooting mode is ON is determined, and the processing proceeds to step S103 if the panning shooting mode is ON, and proceeds to step S112 if the panning shooting mode is not ON.

In step S103, motion vectors throughout the entire image are detected by the motion vector detection unit 116. Next, in step S104, an average value of angular velocities between the barycenters of exposure periods of two frames is acquired from the angular velocities that are the output from the angular velocity detection unit 102. Here, the average value of the angular velocities between the barycenters of the exposure periods is obtained because the motion vector detection unit 116 detects inter-frame difference vectors between the barycenters of the exposure periods when capturing an image. Thus, in later-described step S107, the output from the motion vector detection unit 116 and an on-imaging plane moving amount on the imaging plane calculated from the output from the angular velocity detection unit 102 can be synchronized with each other when creating a histogram thereof.

In step S105, an offset component is eliminated from the average value of the angular velocities between the barycenters of the exposure periods obtained in step S104. The reason for eliminating the offset component is to prevent, in the later-described subject vector calculation, erroneous detection of a subject vector as a result of the on-imaging plane moving amount obtained by converting the angular velocity being offset due to a superimposed offset component. In step S106, the average value of the angular velocities between the barycenters of the exposure periods from which the offset component has been eliminated in step S105 is converted into an on-imaging plane moving amount on the imaging plane by using the information regarding the frame rate and the focal length.

Next, in step S107, a histogram is created from the motion vectors detected in step S103. For example, if a setting is configured in which the number of detection blocks to be used by the motion vector detection unit 116 is six in the vertical direction and ten in the horizontal direction, a histogram constituted by a total of 60 motion vectors is created. The on-imaging plane moving amount on the imaging plane calculated in step S106 is used for creating the histogram. Here, since one piece of angular velocity data is acquired in one frame, a fixed range (e.g. ±10 pix) from the on-imaging plane moving amount on the imaging plane obtained by converting the angular velocity, is set as a threshold value for the background area.

In step S108, whether or not subject vectors can be detected is determined from the histogram created in step S107. If subject vectors can be detected, the processing proceeds to step S109, and if subject vectors cannot be detected, the processing proceeds to step S112.

Next, in step S109, vectors within the fixed range from the on-imaging plane moving amount on the imaging plane calculated in step S106 are set as candidate background vectors, and vectors outside the fixed range are set as candidate subject vectors. Vectors near a vector with the highest frequency among the candidate subject vectors are set as the subject vectors, and an average value thereof is calculated. In step S110, the subject angular velocity calculation unit 118 converts the subject vector calculated in step S109 into a subject angular velocity by using the information regarding the frame rate and the focal length, and the subtracter 119 subtracts therefrom the angular velocity of the image stabilization apparatus that is the output from the offset elimination unit 115. In step S111, the subject angular velocity calculated in step S110 is integrated to calculate a correction signal for subject blur correction.

On the other hand, in step S112, the panning shooting mode is not set, or even if the panning shooting mode is set, subject vectors cannot be detected, and therefore, an angular velocity is acquired from the angular velocity detection unit 102 in order to perform normal image stabilization. Note that, in step S104, the average value of the angular velocities between the barycenters of the exposure periods is acquired, whereas, in step S112, the angular velocity is acquired in a certain interrupt cycle (e.g. 4-kHz sampling rate), rather than using the average of the angular velocities between the barycenters of the exposure periods.

In step S113, since an offset component is superimposed on the output from the angular velocity detection unit 102, the offset component is eliminated through the HPF 103. Next, in step S114, the output from the angular velocity detection unit 102 from which the offset component has been eliminated is processed by the gain/phase characteristic calculation unit 104 that is constituted by the phase compensation filter and the amplifier that performs amplification with a given gain, such that the output has a desired frequency characteristic.

In step S115, the focal length of the imaging optical system is calculated by the focal length calculation unit 105, and the output from the gain/phase characteristic calculation unit 104 is corrected such that the output is an optimum value for driving the image stabilization unit 112, In step S116, the value calculated in step S115 is integrated, and a correction signal for image stabilization is calculated. Next, in step S117, whether or not the panning shooting mode is ON is again determined, and the processing proceeds to step S118 if the panning shooting mode is ON, and proceeds to step S119 if the panning shooting mode is not ON.

Next, in step S118, an optimum shutter speed during panning shooting is calculated. Note that details of this processing will be described later with reference to a flowchart in FIG. 4.

In step S119, whether or not the photographer has pressed the shutter release button is determined. If the shutter release button has been pressed, the processing proceeds to step S120, and if the shutter release button has not been pressed, the processing returns to step S101 and the above processing is repeated.

On the other hand, in step S120, the image stabilization system is driven in accordance with the determination in step S108, based on the subject blur correction signal calculated in step S111 or the image stabilization signal calculated in step S116. In step S121, exposure is performed at the shutter speed during panning shooting calculated in step S118 in a case of the panning shooting mode, or otherwise at a shutter speed based on an exposure value obtained through normal photometric processing in other cases, and the shooting processing ends.

Figure 4:
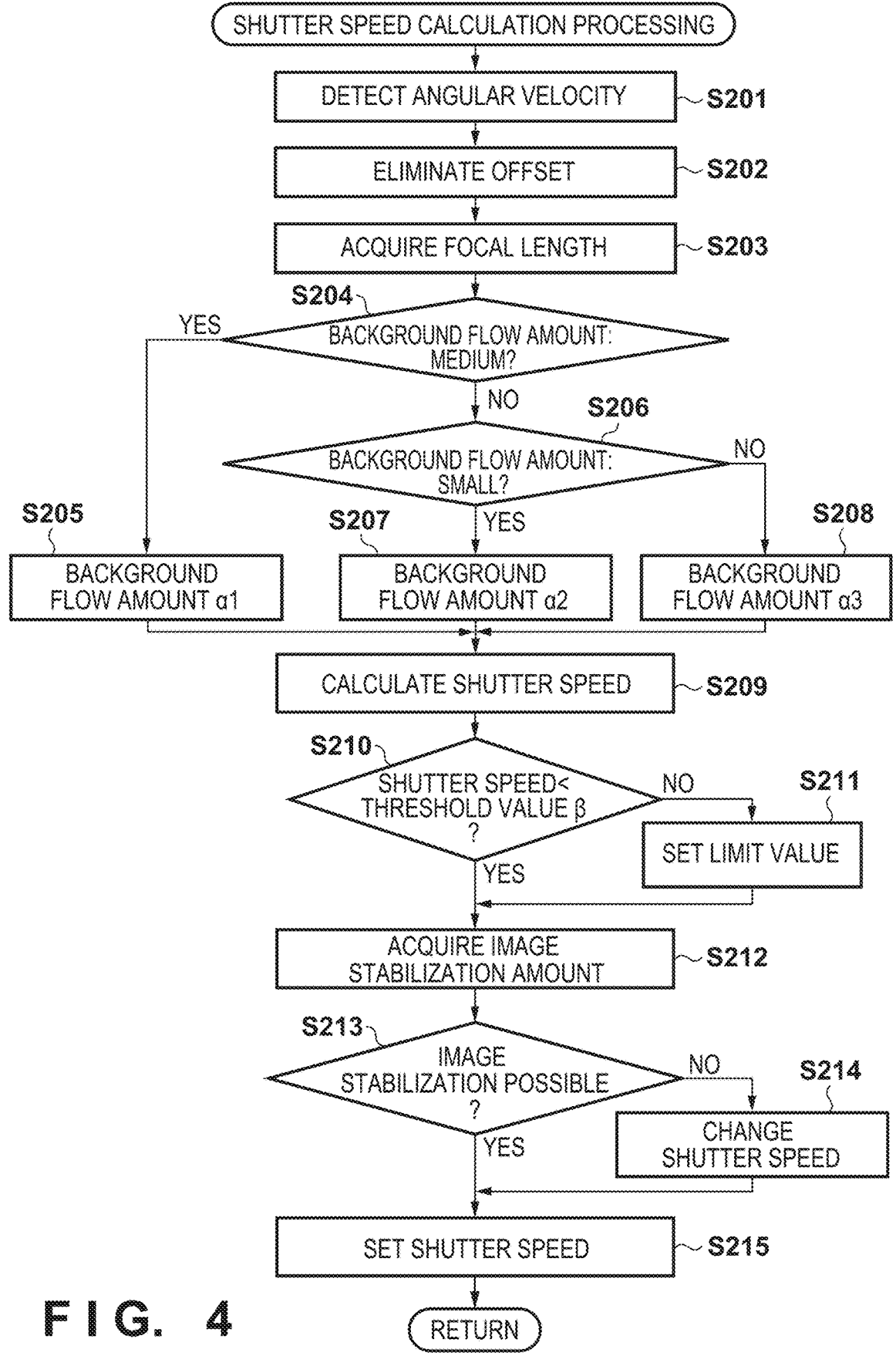
FIG. 4 is a flowchart of shutter speed calculation processing when panning shooting is performed according to the first embodiment.

Next, processing for calculating the shutter speed during panning shooting performed in step S118 will be described with reference to a flowchart in FIG. 4.

Initially, in step S201, an angular velocity is acquired from the angular velocity detection unit 102. The angular velocity at the time of calculating the shutter speed may be the average value of the angular velocities between the barycenters of the exposure periods as in step S104, or may be the angular velocity acquired in a certain interrupt cycle (e.g. 4-kHz sampling rate) as in step S112. An offset component is superimposed on the angular velocity detected in step S201, and the superimposed offset component will cause an error in the shutter speed calculation, and therefore, in step S202, the offset component is eliminated as in step S105 or step S113.

In step S203, the focal length is acquired from the zoom information. In step S204, determination is made regarding a set value of the background flow amount. In this embodiment, there are three types of background flow amounts (small/medium/large), and the photographer sets a background flow amount on the screen of the display unit 162 by using the operation unit 165 before shooting. If the medium background flow amount is set, the processing proceeds to step S205, and if a background flow amount other than medium is set, the processing proceeds to step S206. Note that, although three types of background flow amounts are set in this embodiment, naturally four or more types (multiple levels) may be set, or an arbitrary value may be set as the background flow amount. In step S205, since the medium background flow amount is set, the background flow amount $\alpha$ is set to $\alpha 1$ (e.g. on-imaging plane moving amount on the imaging plane=100 pix).

In step S206, whether or not the small background flow amount is set is determined. If the small background flow amount is set, the processing proceeds to step S207, and if the small background flow amount is not set (i.e. large background flow amount is set), the processing proceeds to step S208. In step S207, since the small background flow amount is set, the background flow amount $\alpha$ is set to $\alpha 2$ (e.g. on-imaging plane moving amount on the imaging plane=70 pix) such that the on-imaging plane moving amount on the imaging plane is smaller than the case of the middle background flow amount.

In step S208, since the large background flow amount is set, the background flow amount $\alpha$ is set to $\alpha 3$ (e.g. the on-imaging plane moving amount on the imaging plane=300 pix) such that the on-imaging plane moving amount on the imaging plane is larger than in the case of the middle background flow amount.

In step S209, the shutter speed Tv during panning shooting is calculated based on Equation (1) such that the background flow amount is always α, regardless of the panning (or tilting) speed.

In step S210, whether or not the shutter speed Tv calculated in step S209 is smaller than a preset threshold value β (e.g. 1/15 seconds) is determined. If the shutter speed Tv is smaller than the threshold value, the processing proceeds to step S212, and if the shutter speed Tv is greater than or equal to the threshold value, the processing proceeds to step S211. If the shutter speed Tv calculated in step S209 is greater than or equal to the threshold value β, it indicates that the exposure period is relatively long. For example, in a case of a long exposure for one second or longer, the risk of a camera shake occurring during the exposure period increases, and therefore, in step S211, the calculated shutter speed Tv is limited to a low-speed limit value (threshold value β).

Figure 5:
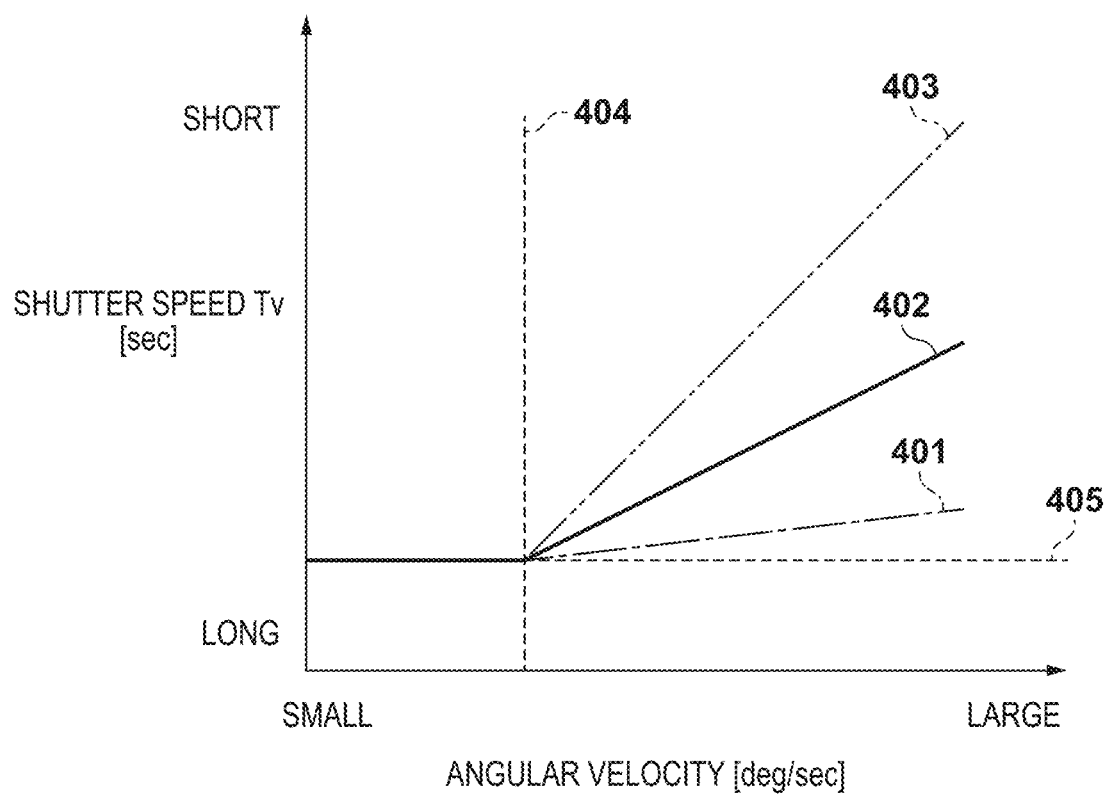
FIG. 5 is a diagram for illustrating a relationship between an angular velocity and a shutter speed with respect to a background flow amount according to the first embodiment.

FIG. 5 shows the relationship between the angular velocity ω and the shutter speed Tv with respect to the aforementioned background flow amounts α1, α2, and α3. The horizontal axis in FIG. 5 indicates the angular velocity ω of the camera, and the vertical axis in FIG. 5 indicates the shutter speed Tv. 401, 402, and 403 denote the shutter speeds Tv at the time of the background flow amount α2, the background flow amount α1, and the background flow amount α3, respectively. 404 denotes a threshold value of the angular velocity ω, and this threshold value is provided in order to prevent a setting of the shutter speed from causing, through Equation (1), long exposure (e.g. for one second or longer) when the angular velocity ω of the camera is small. If the angular velocity ω is smaller than or equal to the threshold value 404, the shutter speed Tv is set to a limit 405 (e.g. 1/15 seconds).

In step S212, the subject blur correction signal or the image stabilization signal calculated in step S111 or step S116 is acquired. In step S213, it is determined whether or not the product of the calculated shutter speed Tv and the calculated subject blur correction amount or shake correction amount falls within a driving range of the image stabilization system. If the product of the calculated shutter speed Tv and the calculated subject blur correction amount or image stabilization amount falls within the driving range of the image stabilization unit 112, the processing proceeds to step S215, and the calculated shutter speed Tv is set. On the other hand, if the product of the obtained shutter speed Tv and the calculated subject blur correction amount or shake correction amount does not fall within the driving range of the image stabilization unit 112, the processing proceeds to step S214, and the obtained shutter speed Tv is changed.

Figure 6:
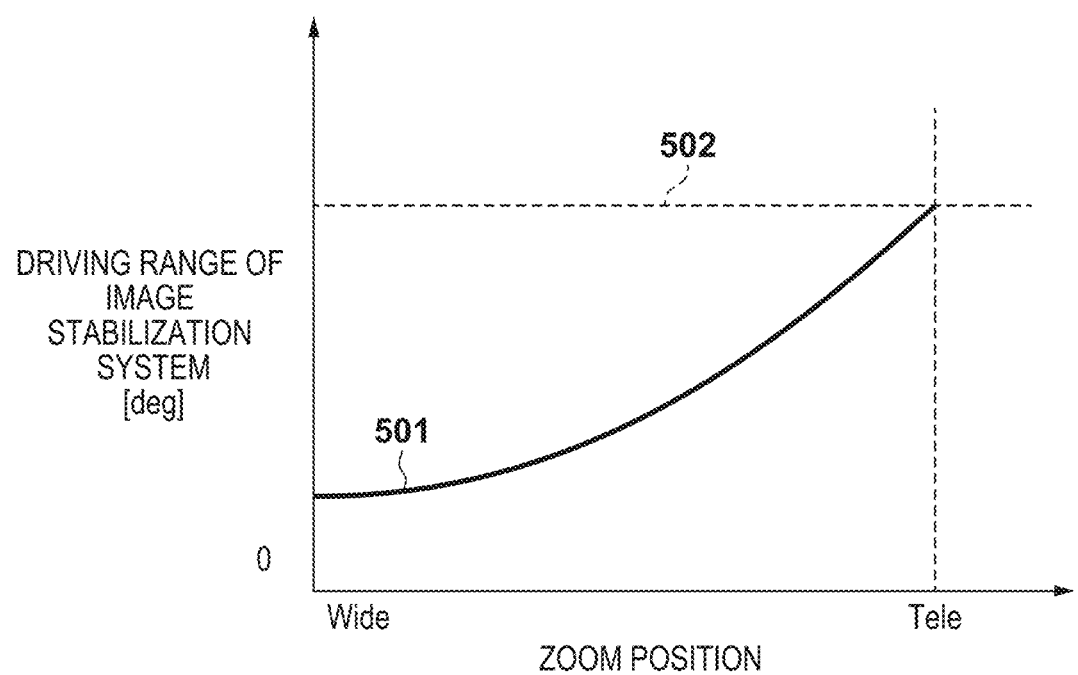
FIG. 6 is a diagram for illustrating a driving range of an image stabilization unit according to the first embodiment.

The change in the shutter speed Tv will now be described using FIG. 6. The horizontal axis in FIG. 6 indicates the zoom position, and the vertical axis in FIG. 6 indicates the driving amount [deg] of the image stabilization system. A curve 501 shows a relationship between the driving amount of the image stabilization system and the zoom position, and a broken line 502 denotes a driving limit of the image stabilization system when the zoom position is telephoto-end. For example, if the zoom position is telephoto-end, the shutter speed Tv calculated in step S209 is 1/20 seconds, and the subject blur correction signal calculated in step S111 is 10 [dps], the driving amount required for image stabilization is 0.5 [deg]. In a case where the driving limit 502 is 0.3 [deg], a difference of 0.2 [deg] is a residual blur. For this reason, in a case where the driving amount required for image stabilization exceeds the driving limit of the image stabilization system, the shutter speed Tv is changed (from 1/20 seconds to less than 1/30 seconds) such that the driving amount of the image stabilization system falls within the driving limit 502 thereof.

As described above, by automatically setting a shutter speed that fixes the on-imaging plane moving amount on the imaging plane, even a photographer who is not used to panning shooting can readily perform panning shooting.

Furthermore, since the shutter speed during panning shooting can be set using the image stabilization system mounted in the image capturing apparatus, the present invention can be realized without increasing the number of apparatus components. However, even in a case of an image capturing apparatus that does not have an image stabilization system, the shutter speed during panning shooting can be set by providing an angular velocity detection unit. In this case, the shutter speed during panning shooting is set independent of whether image stabilization is ON or OFF in step S101 in FIG. 3A. Similarly, in a case of an image capturing apparatus having an image stabilization system as well, panning shooting may be performed when image stabilization is OFF, and at this time, control may be performed for setting the shutter speed by driving the angular velocity detection unit 102.

Second Embodiment

Figure 8:
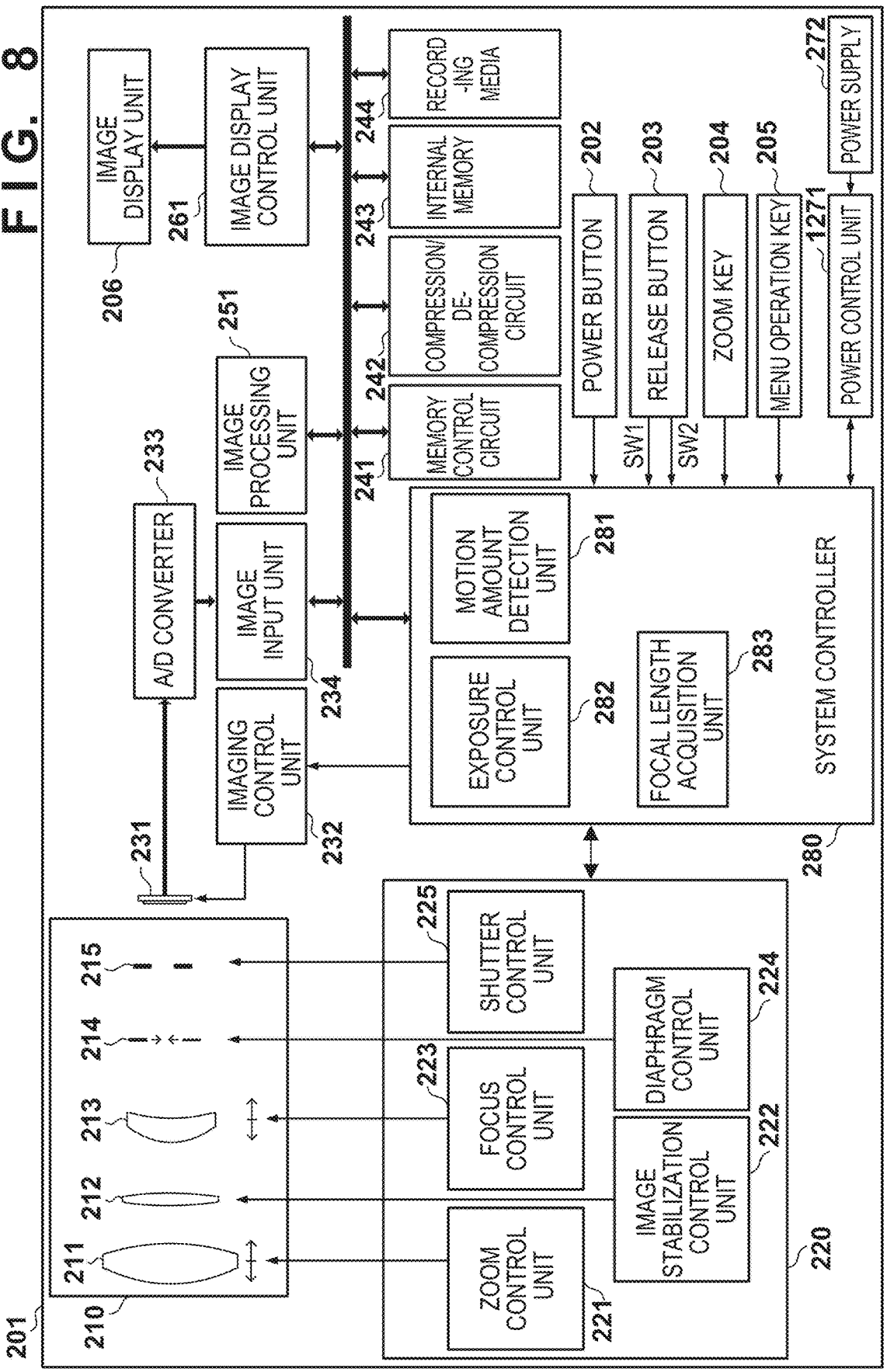
FIG. 8 is a block diagram of an image capturing apparatus according to the second embodiment.

First, a configuration and operation of an image capturing apparatus according to this embodiment will be described with reference to FIG. 8. FIG. 8 is a block diagram of an image capturing apparatus 201. In FIG. 8, an optical unit 210 (imaging optical system) has a zoom lens 211, an image stabilization lens 212, a focus adjustment lens 213, a diaphragm 214, and a shutter 215. A lens drive control unit 220 drives constituent members of the optical unit 210, and has a zoom control unit 221, an image stabilization control unit 222, a focus control unit 223, a diaphragm control unit 224, and a shutter control unit 225.

An image sensor 231 performs photoelectric conversion on an optical image formed via the optical unit 210, and outputs an analog image signal (image data). Operation timing of the image sensor 231 is controlled by an imaging control unit 232. An A/D converter 233 converts the analog image signal output from the image sensor 231 into a digital image signal. The digital image signal output from the A/D converter 233 is stored in an internal memory 243 via an image input unit 234. The image input unit 234 is controlled by a memory control circuit 241. The internal memory 243 is controlled by a system controller 280. An image processing unit 251 performs given pixel interpolation processing, color conversion processing, and the like on data from the A/D converter 233 (digital image data) or data from the memory control circuit 241. The memory control circuit 241 controls the A/D converter 233, the image processing unit 251, a compression/decompression circuit 242, and the internal memory 243. The memory control unit 214 also controls recording of data into a recording media 244.

Image data to be displayed that is written in the internal memory 243 is displayed by an image display unit 206, such as a TFT LCD display, via an image display control unit 261. The internal memory 243 is used for storing a shot still image or moving image, and is also available as a work area for the system controller 280. The compression/decompression circuit 242 is a circuit for compressing or decompressing image data. The compression/decompression circuit 242 reads an image stored in the internal memory 243, performs compression processing or decompression processing thereon, and again writes the processed data in the internal memory 243.

The system controller 280 includes a CPU, an MPU, or the like, and controls the overall image capturing apparatus 201. A power button 202, a release button 203, a zoom key 204, and a menu operation key 205 constitute an operation unit for inputting various operation instructions for the system controller 280. The operation unit is constituted by one of a switch, a dial, a touch panel, and the like, or a combination of some of these constituent members. A signal output according to an operation made using the release button 203 is used as a trigger signal to operate the shutter to record a still image, or a trigger signal to start or stop recording of a moving image.

In this embodiment, the system controller 280 has a motion amount detection unit 281, an exposure control unit 282, and a focal length acquisition unit 283. The motion amount detection unit 281 detects the amount of motion between two consecutively captured frames of images (i.e. between image frames acquired at different timings). In the second embodiment, the motion amount detection unit 281 calculates motion vectors of a subject included in an image (an image corresponding to the image data output from the image sensor 231). The focal length acquisition unit 283 acquires the focal length at the time of shooting. The exposure control unit 282 calculates the appropriate exposure value based on a luminance level obtained through photometry, and controls exposure based on the calculated appropriate exposure value. In this embodiment, the exposure control unit 282 controls the exposure period based on the motion vectors of the subject, vibration information, and the focal length.

The system controller 280 drives the zoom lens 211 in the optical axis direction to control the focal length based on a signal output according to an operation made using the zoom key 204. In this embodiment, the zoom control unit 221 calculates the zoom driving speed and the driving direction based on the direction and the amount of operation made using the zoom key 204 by the photographer, in accordance with an instruction from the system controller 280. The zoom lens 211 moves along the optical axis in accordance with the result of this calculation. With a signal from the power button 202 being a trigger, the power control unit 271 controls a power supply 272 so as to supply power to each part of the image capturing apparatus 201.

In this embodiment, for example, an image stabilization apparatus is constituted by the image stabilization control unit 222 (vibration detection unit 2221) and the system controller 280 (motion amount detection unit 281, exposure control unit 282, and focal length acquisition unit 283).

Figure 9:
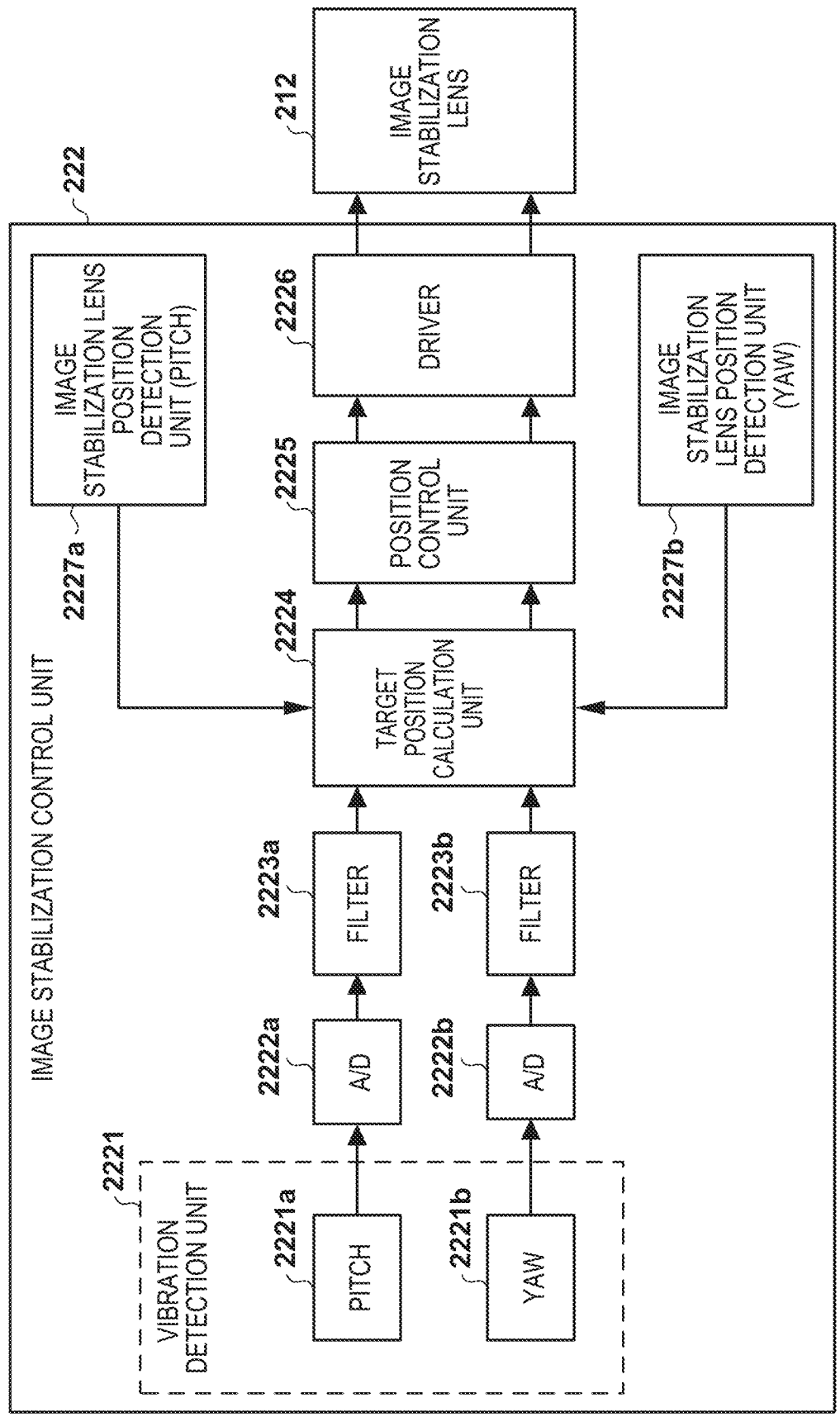
FIG. 9 is a block diagram showing an image stabilization control unit according to the second embodiment.

Next, a configuration and operation of the image stabilization control unit 222 will be described with reference to FIG. 9. FIG. 9 is a block diagram of the image stabilization control unit 222. The image stabilization control unit 222 corrects vibration by driving the image stabilization lens 212 included in the optical unit 210 in a direction perpendicular to the optical axis. The vibration detection unit 2221 included in the image stabilization control unit 222 has a vibration detection sensor, such as an angular velocity sensor for detecting the angular velocity (information regarding the angular velocity), and detects (acquires) a signal (vibration information) of a camera shake applied to the image capturing apparatus 201. A vibration detection unit 2221a detects vibration of the image capturing apparatus 201 in the pitch direction. A vibration detection unit 2221b detects vibration of the image capturing apparatus 201 in the yaw direction.

Figure 10:
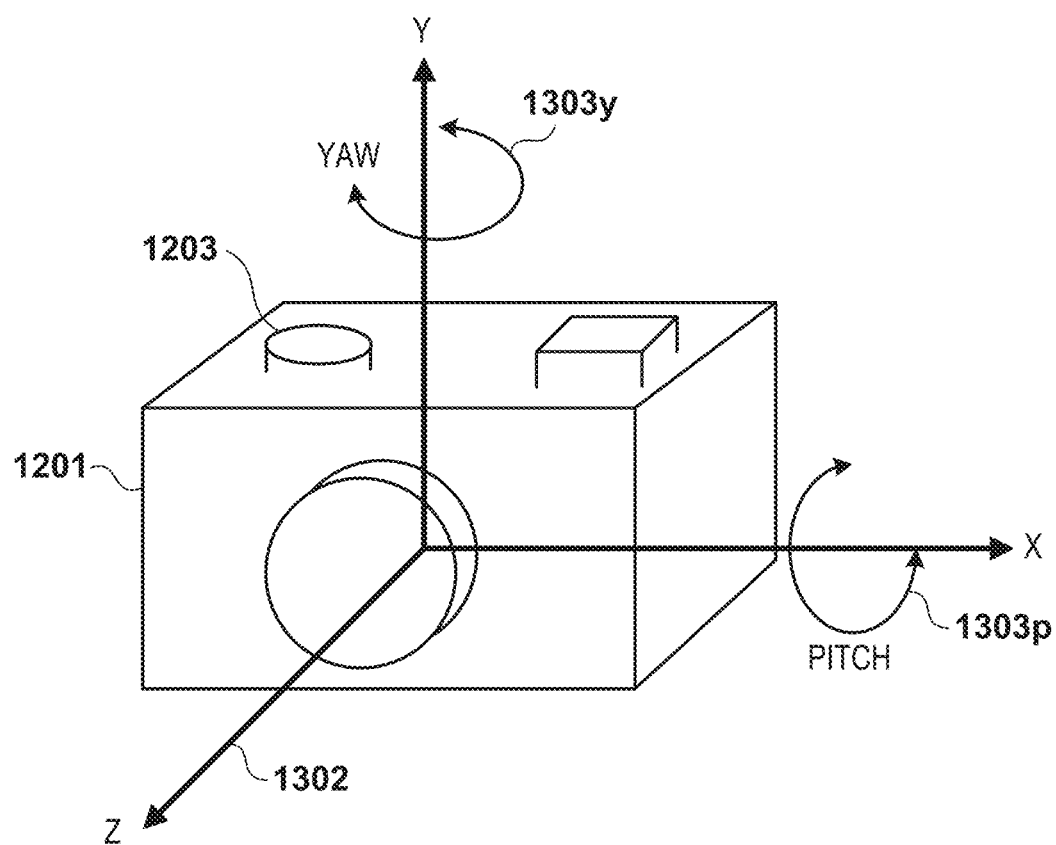
FIG. 10 is an illustrative diagram of axes and directions of the image capturing apparatus according to the second embodiment.

FIG. 10 is an illustrative diagram of the axes and directions of the image capturing apparatus 201. In the image capturing apparatus 201, an optical axis 1302 is parallel to a Z axis, and the pitch direction 1303$p$ and the yaw direction 1303$y$ correspond respectively to a rotation direction around an X axis and a rotation direction around a Y axis. The roll direction corresponds to a rotation direction around the optical axis 1302 (Z axis).

Signals acquired by the vibration detection units 2221a and 2221b are converted into digital signals via A/D converters 2222a and 2222b, respectively. Filters 2223a and 2223b eliminate low frequency components whose frequency is lower than or equal to a given low cutoff frequency, from angular velocity signals obtained through conversion performed by the A/D converters 2222a and 2222b, and output the resulting signals. The filters 2223a and 2223b also calculate vibration angles applied to the image capturing apparatus 201 by integrating the angular velocity signals output from the A/D converters 2222a and 2222b.

A target position calculation unit 2224 amplifies the vibration angles calculated by the filters 2223a and 2223b, based on a zoom position and a focus position, as well as a focal length and a shooting magnification ratio that are obtained therefrom, and calculates a target angle value. This is because image stabilization sensitivity on an imaging plane to a stroke of image stabilization varies due to an optical change, such as a change in the focal length or the shooting magnification ratio. The target position calculation unit 2224 calculates a driving amount of the image stabilization lens 212 based on the target angle value. Note that the zoom position and the focus position, as well as the focal length and the shooting magnification ratio that are obtained therefrom can be acquired via the system controller 280.

A signal indicating a difference between the target position calculated by the target position calculation unit 2224 and the current position of the image stabilization lens 212 acquired by image stabilization lens position detection units 2227a and 2227b are input to a position control unit 2225. A driver 2226 supplies a driving current corresponding to the driving amount of the image stabilization lens 212 to drive the image stabilization lens 212 in accordance with a signal that is output from the position control unit 2225 to the driver 2226.

Figure 7:
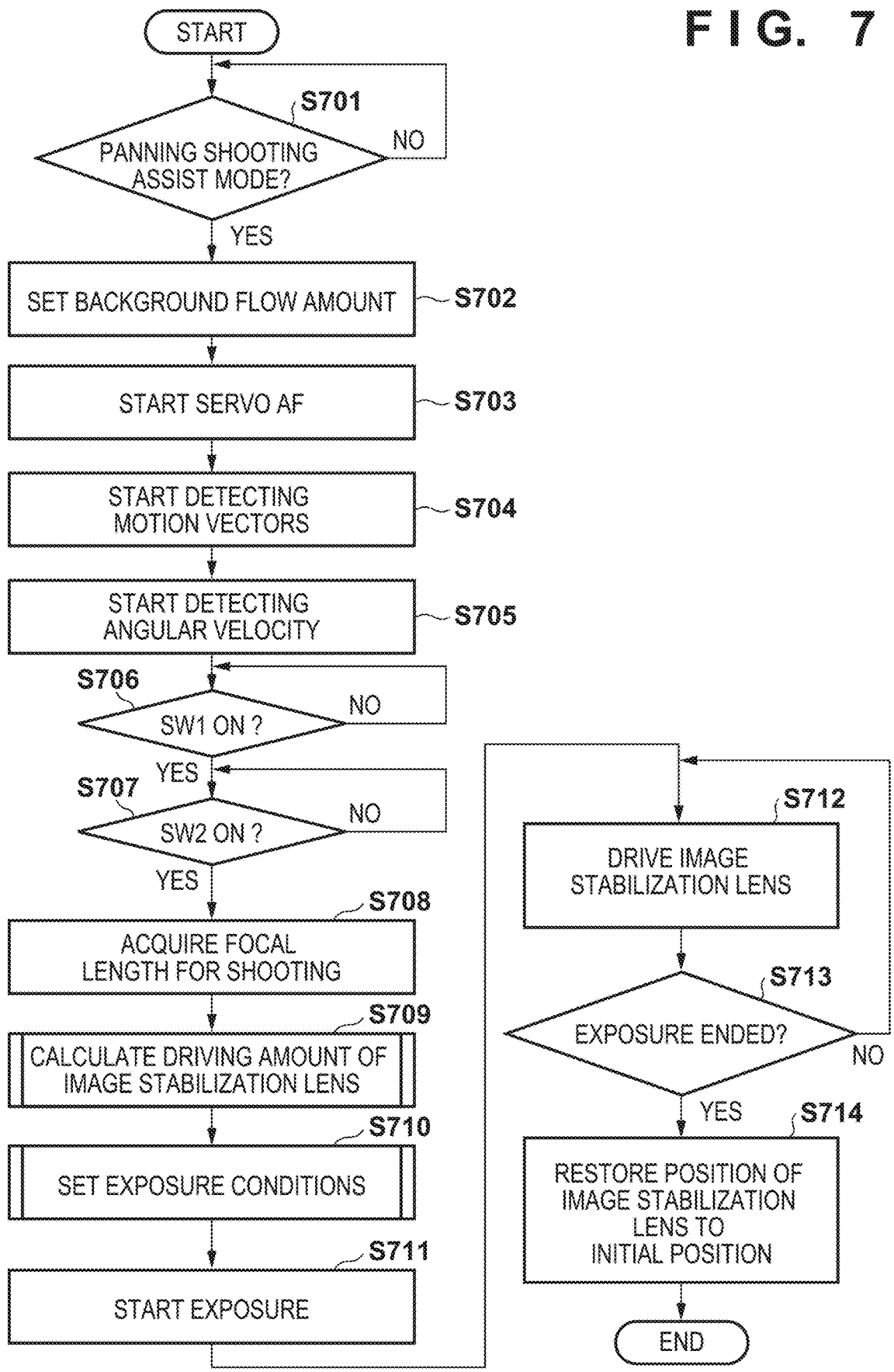
FIG. 7 is a flowchart showing a method for controlling an image capturing apparatus according to a second embodiment.

Next, a description will be given, with reference to FIG. 7, of processing a case where a panning shooting assist mode is set in the image capturing apparatus 201 according to this embodiment (i.e. a method for controlling the image capturing apparatus). FIG. 7 is a flowchart showing a method for controlling the image capturing apparatus 201 (image stabilization apparatus). Steps in FIG. 7 are executed based mainly on instructions from the system controller 280 in the image capturing apparatus 201.

Initially, in step S701, the system controller 280 determines whether or not the panning shooting assist mode is set in the image capturing apparatus 201. If the panning shooting assist mode is set, the processing proceeds to step S702. On the other hand, if the panning shooting assist mode is not set, the system controller 280 performs normal image stabilization processing, and repeats the determination in step S701 until the panning shooting assist mode is set.

In step S702, the system controller 280 sets a background flow amount when panning shooting is performed. At this time, the photographer sets (selects) an arbitrary background flow amount via the operation unit in the image capturing apparatus 201. The background flow amount can be indicated as levels such as large, medium, and small, for example. To allow the background flow amount to be intuitively comprehended, the background flow amount level and a schematic image may be displayed together, or the proportion of the background flow amount to the overall angle of view may be displayed with respect to the respective background flow amount levels.

Subsequently, in step S703, the system controller 280 starts servo AF. Servo AF allows the focus to continuously be on the subject. Note that, although servo AF is performed as a focus control method in the second embodiment, the focus control method is not limited thereto and may be another focus control method.

Subsequently, in step S704, the system controller 280 starts detecting motion vectors. Here, the system controller 280 (motion amount detection unit 281) detects (calculates) motion vectors from a live view image that is acquired at a given frame rate. For example, the motion amount detection unit 281 sets search blocks obtained by dividing an image into a plurality of regions, and detects a motion vector between images in each search block.

In a case where two images acquired in time-series exist, the motion amount detection unit 281 divides the entire region of a first acquired image (image data) into a plurality of blocks (e.g. a plurality of image blocks 1101a in FIG. 11A). Next, the motion amount detection unit 281 also performs the same processing on a second acquired image (image data) in the time series. The motion amount detection unit 281 then compares an image block acquired first in the time series and an image block acquired second in the time series, and calculates similarity therebetween. The motion amount detection unit 281 performs such processing on the entire region while shifting the region to be compared in the second image data, and determines the most similar region as a destination region. The motion amount detection unit 281 performs this processing on all blocks in the image data, and calculates motion vectors in all blocks. This processing method is called a block matching method, whereas motion vectors may be calculated using other methods.

The motion amount detection unit 281 constantly updates the thus calculated value until immediately before exposure, unless the reliability thereof becomes lower than a given value. Thus, the calculation result is reflected until immediately before exposure, enabling accurate panning shooting control during exposure.

Subsequently, in step S705, the vibration detection unit 2221 in the image stabilization control unit 222 detects the angular velocity applied to the image capturing apparatus 201 with respect to the respective axes. Subsequently, in step S706, the system controller 280 determines whether or not the release button 203 is in a half-pressed state (hereinafter denoted as "SW1_ON"). In a case of SW1_ON, the processing proceeds to step S707. On the other hand, in a case of SW1_OFF, the system controller 280 repeats the determination in step S707 until the release button 203 enters a half-pressed state (SW1_ON).

Subsequently, in step S707, the system controller 280 determines whether or not the release button 203 is in a fully-pressed state (hereinafter denoted as "SW2_ON"). In a case of SW2_ON, the processing proceeds to step S708. On the other hand, in a case of SW2_OFF, the system controller 280 repeats the determination in step S707 until the release button 203 enters a fully-pressed state (SW2_ON).

Subsequently, in step S708, the system controller 280 (focal length acquisition unit 283) acquires the focal length at the time of shooting. Subsequently, in step S709, the system controller 280 (motion amount detection unit 281) calculates a driving amount of the image stabilization lens 212. A description will now be given, with reference to FIG. 12, of a method for calculating the driving amount of the image stabilization lens 212. FIG. 12 is a flowchart showing the method for calculating the driving amount of the image stabilization lens 212. Steps in FIG. 12 are executed mainly by the motion amount detection unit 281 and the image stabilization control unit 222.

Initially, in step S801, the motion amount detection unit 281 performs histogram processing based on the motion vectors detected (calculated) in step S704. A case where the calculated motion vectors are as shown in FIGS. 11A to 11C will now be considered. FIG. 11A shows the directions of the motion vectors, FIG. 11B shows the values of the motion vectors, and FIG. 11C shows the result of performing the histogram processing on the motion vectors. As shown in FIGS. 11A and 11B, in this embodiment, the entire region of the image is divided into a plurality of image blocks 1101a by the motion amount detection unit 281. Note that, in this embodiment, motion vectors of only a horizontal movement in the images are calculated to simplify the description, but this need not be the case.

Subsequently, in step S802, the motion amount detection unit 281 estimates the background moving amount based on the angular velocity applied to the image capturing apparatus 201. A background moving amount A [pixel] can be obtained as indicated by Equation (2) below.

$$A = f \tan(-\omega/FR)/PP \quad (2)$$

In Equation (2), f denotes a focal length [mm], FR denotes a frame rate [fps], and PP denotes a cell pitch [mm]. Note that an angular velocity $\omega$ [rad/sec] can be acquired by the vibration detection unit 2221 (vibration detection sensor).

Subsequently, in step S803, the motion amount detection unit 281 performs processing for partitioning (separating) the motion vectors in the image into background vectors (motion vectors of the background) and subject vectors (motion vectors of the subject). If the background moving amount A obtained in step S802 is 5, it can be estimated that values of sizes other than 5 are the subject vectors as shown in FIG. 11C. Thus, the motion amount detection unit 281 extracts the subject vectors from among the motion vectors. Note that, although, in this embodiment, the background vectors are separated from the subject vectors based on the angular velocity applied to the image capturing apparatus 201, this need not be the case, and the motion vectors in the image may be separated into the background vectors and the subject vectors by using other methods. Commonly, the photographer performs shooting while panning in order to keep the subject at one point within the angle of view. For this reason, larger motion vectors are output in the background, and the motion vectors of the subject is output as amounts of residual blur. The motion vectors in the image may also be separated into the background vectors and the subject vectors by using this tendency. It can be thus determined that regions that can be separated as the background (background regions) are hatched portions in FIG. 11B, and the remaining portions correspond to the subject (subject regions).

Subsequently, in step S804, the system controller 280 calculates the driving amount of the image stabilization lens 212. The driving amount of the image stabilization lens 212 can be calculated from the subject vectors. This is because, as mentioned above, the subject vectors are the motion vectors corresponding to the amounts of residual blur, and each correspond to a difference in the angular velocity in a case where the photographer has performed a panning operation. The image stabilization control unit 222 corrects these amounts of residual blur with the image stabilization lens 212 based on an instruction from the system controller 280, and performs control for stopping the movement of the subject. The amounts of residual blur can be corrected using a dominant vector having the largest value among the subject vectors, for example. Alternatively, the amounts of residual blur may be corrected using an average value Va of the subject vectors. The flowchart in FIG. 12 (step S709) ends here.

Figure 13:
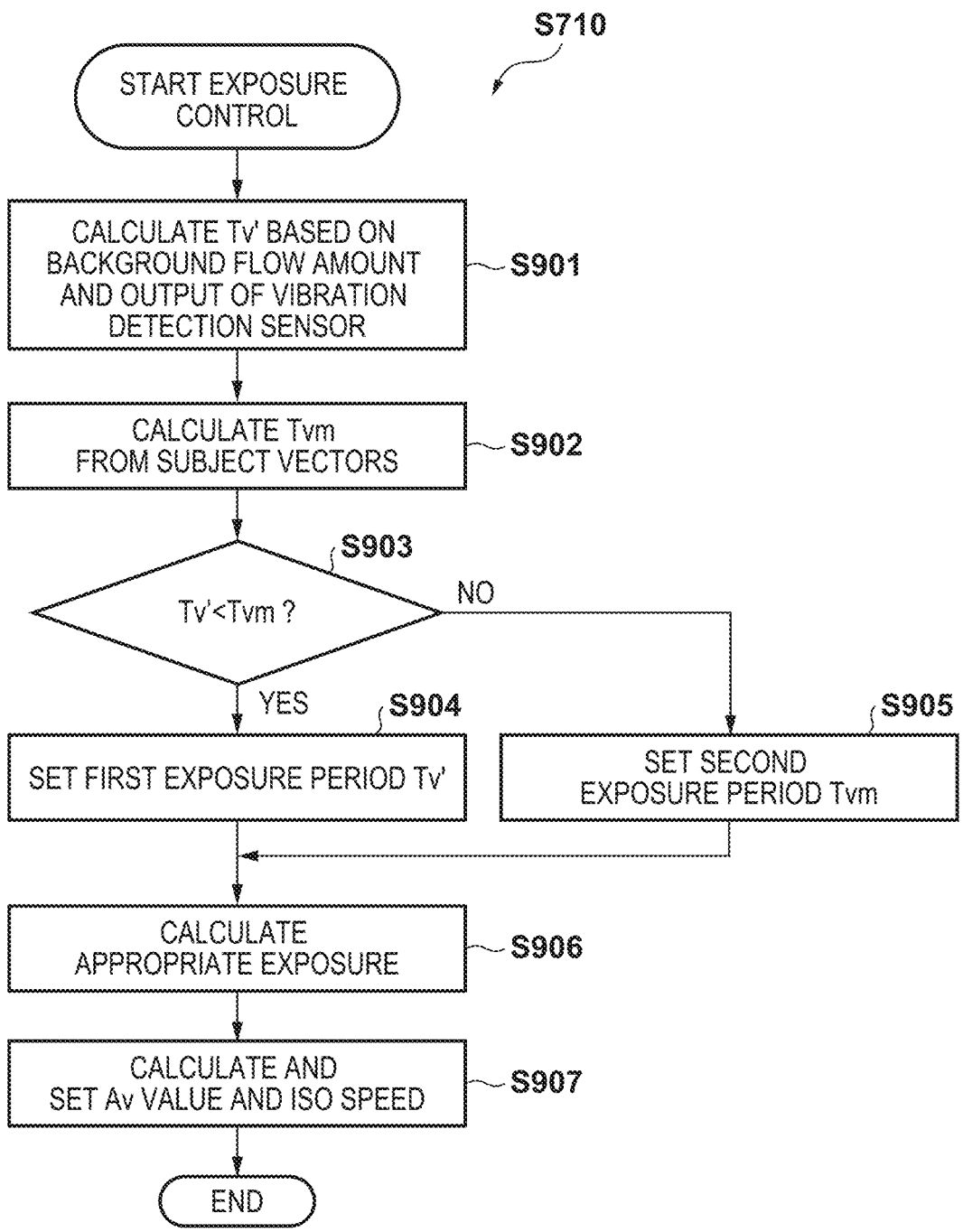
FIG. 13 is a flowchart showing an exposure control method according to the second embodiment.

Subsequently, in step S710, the system controller 280 (exposure control unit 282) sets exposure conditions. An exposure control method will now be described with reference to FIG. 13. FIG. 13 is a flowchart showing the exposure control method. Steps in FIG. 13 are executed mainly by the exposure control unit 282.

Initially, in step S901, the exposure control unit 282 calculates a first exposure period Tv' [sec] based on the background flow amount that is set in step S702, and the output from the vibration detection unit 2221. Here, the background flow amount is denoted as X[%] relative to the angle of view (which is set by the photographer in step S702), the angular velocity applied to the image capturing apparatus 201 is denoted as ω [deg/sec], and the focal length is denoted as f [mm]. The cell pitch of the image sensor 231 is denoted as PP [mm/pixel], the pixel size in the vertical direction is denoted as Gv [pixel], and the pixel size in the horizontal direction is denoted as Gh [pixel]. It is assumed that the photographer is panning in the horizontal direction.

If the background flow amount is converted into a pixel number by using these values, a background flow amount B [pixel] can be expressed as Equation (3) below.

$$B = Gh \times X \times PP \tag{3}$$

The first exposure period Tv' [sec] is expressed as Equation (4) below by using the background flow amount B [pixel].

$$Tv' = C \cdot B/(f \cdot \omega) \tag{4}$$

In Equation (4), C is an arbitrary constant.

Subsequently, in step S902, the exposure control unit 282 sets an upper limit value of the exposure period (maximum exposure period) based on the subject vector calculation result (motion vectors of the subject). Here, the upper limit value of the exposure period is denoted as a second exposure period Tvm [sec]. The second exposure period Tvm can be obtained as follows, for example. Initially, the exposure control unit 282 obtains the average value Va of the subject vectors from the result shown in FIG. 11C. Next, the exposure control unit 282 obtains the largest value Vm of the subject vectors. When a subject blur tolerance value (given tolerance value) is denoted as I [pixel], the second exposure period Tvm needs to satisfy Conditional Expression (5) below.

$$(Vm - Va) \times Tvm < I \tag{5}$$

Accordingly, the second exposure period Tvm is expressed as Equation (6) below.

$$Tvm = I/(Vm - Va) \tag{6}$$

Note that the subject blur tolerance value I can be any value, and may be determined (changed) in accordance with a subject to be shot or a shooting scene.

Subsequently, in step S903, the exposure control unit 282 compares the first exposure period Tv' calculated in step S901 with the second exposure period Tvm calculated in step S902. If, as a result of comparing the first exposure period Tv' with the second exposure period Tvm, the first exposure period Tv' is shorter than the second exposure period Tvm (Tv'<Tvm), the processing proceeds to step S904, and the exposure control unit 282 sets the exposure period to be used in shooting to the first exposure period Tv'. On the other hand, if the first exposure period Tv' is longer than or equal to the second exposure period Tvm (Tv'≥Tvm), the processing proceeds to step S905, and the exposure control unit 282 sets the exposure period to be used in shooting to the second exposure period Tvm.

Thus, in this embodiment, preferably, the exposure control unit 282 controls the exposure period such that the exposure period does not exceed the maximum exposure period (second exposure period Tvm) obtained in accordance with the motion vectors of the subject. More preferably, the motion amount detection unit 281 calculates, as the motion vectors of the subject, the largest value Vm and the average value Va of the motion vectors at a plurality of positions in the subject. The exposure control unit 282 then determines the maximum exposure period based on a difference (Vm−Va) between the largest value Vm and the average value Va of the motion vectors. More preferably, the exposure control unit 282 determines the maximum exposure period based on the difference (Vm−Va) between the largest value Vm and the average value Va of the motion vectors, and the subject blur tolerance value I determined in accordance with the subject or the shooting scene (e.g. according to Equation (6)). Preferably, the exposure control unit 282 calculates the first exposure period Tv' based on the vibration information and the background flow amount set by the user (step S901), and compares the first exposure period with the maximum exposure period (step S903). If the first exposure period is shorter than the maximum exposure period, the first exposure period is set as the exposure period (step S904), and if the first exposure period is longer than or equal to the maximum exposure period, the maximum exposure period is set as the exposure period (step S905). Thus, by limiting the exposure period while giving consideration to the subject speed, it is possible to prevent excessive flow of the subject and set an appropriate exposure period in accordance with the subject.

Subsequently, in step S906, the exposure control unit 282 performs appropriate exposure calculation. A photometric value calculated here is denoted as By (Bv value). Subsequently, in step S907, the exposure control unit 282 calculates and sets an Av value and an ISO speed based on the Bv value obtained in step S906, the exposure period (Tv value) set in step S904 or step S905, and a diagram for the panning shooting mood.

Here, Equations (7) to (10) below are used in exposure calculation.

$$Bv = Tv + Av - Sv \tag{7}$$

$$Tv = -\log 2 \tag{8}$$

$$Av = 2 \log 2 \tag{9}$$

$$Sv = \log 2(0.3 \times \text{ISO speed}) \tag{10}$$

The exposure control unit 282 sets the exposure value obtained thereby, and ends the flow in FIG. 13 (step S710).

Subsequently, in step S711, the system controller 280 starts exposure. Then, in step S712, the image stabilization control unit 222 drives the image stabilization lens 212 while performing exposure, based on an instruction from the system controller 280.

The image stabilization lens 212 is driven in accordance with the driving amount calculated in step S709. In the second embodiment, the image sensor 231 performs photoelectric conversion on the optical image to output image data, while the image stabilization lens 212 is driven in a direction perpendicular to the optical axis by the image stabilization control unit 222 with the exposure period set in step S710.

Subsequently, in step S713, the system controller 280 determines whether or not the set exposure period has ended. If the exposure has not ended, the processing returns to step S712. If the exposure has ended, the processing proceeds to step S714. In step S714, the system controller 280 (image stabilization control unit 222) restores the position of the image stabilization lens 212 to its initial position.

According to the second embodiment, the exposure period obtained from the background flow amount is compared with the exposure period obtained from the largest value of the subject vectors to limit the exposure period. Thus, it is possible to prevent the ambience brought out by panning shooting from being lost due to the subject flowing. Note that the method for calculating the exposure period is not limited thereto. For example, a method of calculating the exposure period from a difference between a background vector and an subject vector may be used, or a method of calculating the exposure period from a difference between a motion vector of a focal point and an subject vector may be used.

The method for limiting the exposure period is not limited thereto either. For example, a configuration may be employed in which an exposure period obtained by multiplying the first exposure period by a constant is set, such that a panning shooting effect is caused to reliably appear regardless of the magnitude of subject vectors. Thus, even a photographer who is not used to panning shooting can automatically set an exposure period with which movement of an subject can be stopped while letting the background flow, irrespective of the subject. Accordingly, even an inexperienced photographer can readily obtain a realistic panning image.

Portions of the above-described embodiments may be combined as appropriate. For example, the motion amount detection unit 281 may calculate the smallest value of motion vectors at a plurality of positions in a subject as motion vectors of the subject, and the exposure control unit 282 may control the exposure period based on the smallest value of the motion vectors. The motion amount detection unit 281 may calculate motion vectors of a subject and motion vectors of the background included in an image, and the exposure control unit 282 may control the exposure period based on the motion vectors of the subject and the motion vectors of the background. The image stabilization control unit 222 can also correct vibration by driving the image sensor 231, in place of the image stabilization lens 212, in a direction perpendicular to the optical axis. In this case, the image sensor 231 performs photoelectric conversion on an optical image to output image data while being driven by the image stabilization control unit 222 during a set exposure period.

With the image capturing apparatus according to the above embodiments, even a photographer who is not used to panning shooting can automatically set an exposure period with which movement of an subject can be stopped while letting the background flow, irrespective of the subject. Therefore, the above embodiments can provide an image stabilization apparatus, an image capturing apparatus, a lens unit, an image stabilization apparatus control method, a program, and a storage medium with which a realistic panning image can be readily acquired.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2016-012791, filed on Jan. 26, 2016, and No. 2016-012906, filed on Jan. 27, 2016, which are hereby incorporated by reference herein in their entirety.

What is claimed is:

1. An image stabilization apparatus comprising:
a calculation unit that calculates motion vectors included in an image signal obtained by an image sensor;
a motion amount detection unit that classifies each of the motion vectors into a background vector and a subject vector based on vibration information from an angular velocity detecting unit that detects vibration information of the image stabilization apparatus caused by a panning operation by a user;
an exposure control unit that controls an exposure period using the subject vector, vibration information detected by the angular velocity detecting unit, and a focal length, without using the background vector; and
an image stabilization control unit that performs image stabilization by driving an image stabilization lens included in an imaging optical system in a direction perpendicular to an optical axis of the imaging optical system using the subject vector without using the background vector,
wherein each unit is implemented by one or more processors, circuitry or a combination thereof,
wherein the calculation unit calculates a largest value and an average value of the subject vectors each calculated for each of a plurality of blocks obtained by dividing an area of the subject, wherein the exposure control unit determines a maximum exposure period based on a difference between the largest value and the average value of the subject vectors, and wherein the exposure control unit controls the exposure period so that the exposure period does not exceed the maximum exposure period.

2. The image stabilization apparatus according to claim 1, wherein the exposure control unit determines the maximum exposure period based on the difference between the largest value and the average value of the subject vectors, and a subject blur tolerance value that is determined in accordance with the subject or a shooting scene.

3. The image stabilization apparatus according to claim 2, wherein the exposure control unit calculates a first exposure period based on the vibration information and a background flow amount that is set by a user, compares the first exposure period with the maximum exposure period, sets the first exposure period as the exposure period if the first exposure period is shorter than the maximum exposure period, and sets the maximum exposure period as the exposure period if the first exposure period is longer than or equal to the maximum exposure period.

4. A method for controlling an image stabilization apparatus comprising:

calculating motion vectors included in an image signal obtained by an image sensor;

classifying each of the motion vectors into a background vector and a subject vector based on vibration information from an angular velocity detecting unit that detects vibration information of the image stabilization apparatus caused by a panning operation by a user;

controlling an exposure period using the subject vector, the vibration information, and a focal length, without using the background vector; and performing image stabilization by driving an image stabilization lens included in an imaging optical system in a direction perpendicular to an optical axis of the imaging optical system using the subject vector without using the background vector, wherein a largest value and an average value of the subject vectors, each calculated for each of a plurality of blocks obtained by dividing an area of the subject, are calculated, wherein a maximum exposure period is determined based on a difference between the largest value and the average value of the subject vectors, and wherein the exposure period is controlled so that the exposure period does not exceed the maximum exposure period.

* * * * *